| United States Patent [19] | [11] | 4,093,791 |
|---|---|---|
| Bauer et al. | [45] | June 6, 1978 |

[54] PROCESS FOR SUSPENSION POLYMERIZATION OF VINYL CHLORIDE WITH MOLECULAR OXYGEN

[75] Inventors: Johann Bauer; Joseph Heckmaier, both of Burghausen, Germany

[73] Assignee: Wacker-Chemie GmbH, Munich, Germany

[21] Appl. No.: 607,207

[22] Filed: Aug. 25, 1975

Related U.S. Application Data

[63] Continuation of Ser. No. 386,724, Aug. 8, 1973, abandoned, which is a continuation of Ser. No. 812,399, Apr. 1, 1969, abandoned.

[30] Foreign Application Priority Data

Mar. 29, 1968 Germany ............................ 1770090

[51] Int. Cl.$^2$ ............................ C08F 4/28; C08F 2/20
[52] U.S. Cl. ............................ 526/200; 526/235; 526/344.2
[58] Field of Search ............................ 526/235, 200, 344

[56] References Cited

U.S. PATENT DOCUMENTS

| 2,388,178 | 10/1945 | Peterson | 526/235 |
| 2,396,920 | 3/1946 | Larson | 260/94.9 |
| 2,414,311 | 1/1947 | Larson | 260/94.9 |
| 2,472,811 | 6/1949 | Dickey | 526/235 |
| 3,205,204 | 9/1965 | Heckmaier | 260/87.1 |
| 3,375,238 | 3/1968 | Bauer | 260/92.8 |

OTHER PUBLICATIONS

Chem. Abst., 42, 4392h (Prat, Jean, Polym. of Vinyl Chloride).
Chem. Abst., 54, 253i (Lederer, M., Vinyl Chloride Peroxide).
D'Alelio, G. F. Fundamental Principles of Polymerization, Wiley & Sons, Inc. (N.Y.), 1952, pp. 205–207.
Uno, T., Study on Polymerization of Vinyl Chloride, in Kobunshi Kagaku, vol. 14, 1957, pp. 345–352.

*Primary Examiner*—Christopher A. Henderson, Jr.
*Attorney, Agent, or Firm*—Hammond & Littell

[57] ABSTRACT

An improvement in the suspension polymerization of a polymerizate containing at least 90% polyvinyl chloride by the steps of mixing monomers selected from the group consisting of vinyl chloride and mixtures of vinyl chloride with up to 10% of olefinically unsaturated compounds copolymerizable with vinyl chloride, with water in the presence of a polymerization catalyst and suspension stabilizers, heating said mixture under continuous agitation to polymerization temperatures and recovering said polymerizate. The improvement comprises utilizing a gas containing molecular oxygen as the sole catalyst or catalyst-forming substance. The so-prepared polymerizate forms sheets with a lower content of "fish eyes" and a greater heat stability.

3 Claims, No Drawings

PROCESS FOR SUSPENSION POLYMERIZATION OF VINYL CHLORIDE WITH MOLECULAR OXYGEN

REFERENCE TO PRIOR APPLICATIONS

This application is a continuation of pending Ser. No. 386,724, filed Aug. 8, 1973, and now abandoned, which in turn is a continuation of Ser. No. 812,399, filed Apr. 1, 1969 and now abandoned.

THE PRIOR ART

Suspension polymerization, sometimes also called "pearl polymerization", of vinyl chloride, that is, the polymerization of vinyl chloride in an aqueous dispersion in the presence of dispersing agents, using monomer-soluble catalysts, to give polymer suspensions which settle rapidly after the agitation of the polymerization batch used during the polymerization to maintain the dispersion has stopped, has been known for a long time. In the presently known methods for the suspension polymerization of olefinic unsaturated compounds, the presence of oxygen was mostly avoided, because it was found that oxygen can delay the initiation of the polymerization and lead to products with an undesired low viscosity, that is, an undesired low degree of polymerization (see, for example, C. E. Schildknecht, "Polymer Processes", New York, 1956, p. 99).

It is also known that oxygen forms peroxides with vinyl chloride, with which a "substance polymerization", sometimes also called "block polymerization" of vinyl chloride can be effected. But only a small amount of polymer is formed. The peroxides of vinyl chloride are already hydrolyzed at temperatures below 35° C.

OBJECTS OF THE INVENTION

An object of the present invention is the obtention of polymerizates based on polyvinyl chloride, as produced by suspension polymerization, which have a greater heat stability and form sheets with a low content of "fish eyes".

Another object of the present invention is in the suspension polymerization process for the production of polymerizates containing at least 90% polyvinyl chloride which comprises polymerizing a suspension of monomers selected from the group consisting of vinyl chloride and mixtures of vinyl chloride with up to 10% of olefinically unsaturated compounds copolymerizable with vinyl chloride, in water in the presence of a polymerization catalyst and a water-soluble suspension stabilizer, the improvement which comprises utilizing solely a gas containing molecular oxygen as said polymerization catalyst.

A further object of the present invention is the development of a process for the production of a polymerizate containing at least 90% polyvinyl chloride by suspension polymerization which comprises the steps of (1) mixing monomers selected from the group consisting of vinyl chloride and mixtures of vinyl chloride with up to 10% of olefinically unsaturated compounds copolymerizable with vinyl chloride, with water in the presence of suspension stabilizers and a gas containing molecular oxygen as the sole polymerization catalyst or catalyst-forming substance, (2) heating said mixture to polymerization temperatures while under continuous agitation for a time sufficient to effect polymerization, and (3) recovering said polymerizate.

These and other objects of the invention will become more apparent as the description thereof proceeds.

DESCRIPTION OF THE INVENTION

It was found, surprisingly, that in the suspension polymerization of vinyl chloride, that is, in a polymerization of vinyl chloride in an aqueous dispersion, using molecular oxygen as the sole catalyst and the sole catalyst-forming substance, polymers are obtained in a very good yield which are more heat stable and which yield sheets with a substantially lower content of so-called "fish eyes", than the polymers of vinyl chloride produced by means of organic peroxides which are mostly used as catalysts in suspension polymerization.

The subject of the invention is, therefore, a method for the suspension polymerization of vinyl chloride, characterized in that a gas containing a molecular oxygen is used as the sole catalyst or catalyst-forming substance.

The process of the invention is conducted under normal suspension polymerization conditions utilizing dispersing agents or suspension stabilizers normally utilized such as protective colloids, emulsifiers, inorganic salts and conventional aids which do not catalyze the polymerization.

Up to 10% by weight, based on the total weight of monomers, of olefinically unsaturated compounds, which are copolymerizable with vinyl chloride, can be polymerized together with vinyl chloride according to the process of the invention. Examples of olefinically unsaturated compounds that can be copolymerized with vinyl chloride are vinylidene chloride, vinyl esters of saturated aliphatic monocarboxylic acids, such as vinyl acetate and vinyl propionate, vinyl ethers, such as vinyl-n-butyl ether, and esters of unsaturated dicarboxylic acids, like di-(2-ethylhexyl)-fumarate and fumaric esters of mixtures of saturated monohydric alcohols with 14 to 20 carbon atoms, as well as oleyl alcohol.

As dispersing agents or suspension stabilizers, those generally employed in the suspension polymerization of vinyl chloride can be used. These are mostly protective colloids, which are also preferred in the method according to the invention, such as polyvinyl alcohol which contains, if necessary, up to 40 mol percent of acetyl groups, gelatins, cellulose ether derivatives, for example, water-soluble soluble methyl cellulose, hydroxyethyl cellulose, hydroxyethylmethyl cellulose and hydroxypropylmethyl cellulose, as well as water-soluble salts of copolymers of maleic acid or its half esters with styrene or vinyl acetate and vinyl esters of saturated branched carboxylic acids. Because polymers with a particularly preferred particle size are obtained with it, hydroxyethyl cellulose is preferred as a dispersing agent. The protective colloids are used preferably in quantities of 0.01 to 0.5% by weight, particularly 0.04 to 0.25% by weight, based on the weight of vinyl chloride or mixed monomers.

Anionic, cationic, amphoteric and non-ionic emulsifiers and/or inorganic salts may be concurrently used in amounts of 0.001 to 1% by weight, based on the weight of water in the dispersion. Examples of anionic emulsifiers are the following: alkali metal salts, especially the sodium and potassium salts, as well as ammonium and alkaline earth metal salts, particularly the calcium salts; of long chain fatty acids or higher alkanoic acids such as lauric acid, stearic acid and isotridecanoic acid; of high unsaturated aliphatic hydrocarbon monocarboxylic acids, such as oleic acid; of rosin acids such as abietic acid; of protein fatty acid condensation products; of acid phosphoric acid alkyl esters, such as sodium diethylhexyl-phosphate; of acid fatty alcohol sulfuric acid esters; of hydrocarbon sulfonic acids, such as those which are available in commerce under the mark "Mersolates"; of alkylnaphthalene sulfonic acids; and of sulfosuccinic acid dialkyl esters such as sodium diethylhexyl sulfosuccinate.

Cationic emulsifiers may also be used, such as dodecyl trimethyl ammonium bromide as well as amphoteric emulsifiers such as dodecyl betaine.

Examples of non-ionic emulsifiers are partial fatty acid esters of polyvalent alcohols, such as glycerin monostearate, sorbitol monolaurate or sorbitol monopalmitate; partial ethers of higher fatty alcohols and polyvalent alcohols; polyoxyethylene esters of fatty acids; polyoxyethylene ethers of fatty alcohols and alkylphenols; as well as the polypropylene oxide-polyethylene oxide block polymer sold under the tradename "Pluronics".

Examples of inorganic salts include water-soluble alkali metal and alkaline earth metal salts of hydrochloric acid, sulfuric acid; carbonic acid and phosphoric acid, such as sodium chloride, sodium polyphosphate, sodium sulfate, calcium chloride, magnesium chloride and calcium bicarbonate. If inorganic salts are used concurrently the alkali metal chlorides and alkali metal sulfates as well as alkaline earth metal chlorides, especially calcium chloride, are preferred.

Conventional aids which do not catalyze the polymerization, apart from those mentioned above, like particle size and molecular size regulators, can also be used.

Because of the better utilization of the space in the polymerization vessel, the more or less pure oxygen commercially available in pressure vessels is preferably utilized as a gas containing molecular oxygen. If necessary, however, other gases, consisting of gases which are inert to vinyl chloride at the polymerization temperature and containing molecular oxygen, can be utilized as, for example, air. In this connection it should be pointed out that a hitherto unmentioned advantage of the method according to the invention consists in that this method avoids the frequently undesirable precautions in the storage and handling of the catalysts used heretofore in the suspension polymerization of vinyl chloride, particularly of peroxide compounds, because such catalysts are not added to the polymer batch in the method according to the invention. Preferably the oxygen is used in amounts of from 0.01 to 3% by weight, based on the weight of vinyl chloride or the monomer mixtures.

The term "as the sole catalyst-forming substance", which is used here in the specification and in the claims, indicates that it cannot be excluded that a compound produced in situ of vinyl chloride and molecular oxygen catalyzes the polymerization of vinyl chloride in the aqueous dispersion rather than the molecular oxygen added.

The ratio of water to monomer in the process of the invention is not critical. In general, the amount of monomer is from 10 to 60%, particularly from 20 to 50%, of the total weight of water and monomer.

The pH value of the polymerization reaction mixture is adjusted in the range of 1.0 to 7.5. The polymerization temperature is preferably from 65° to 80° C.

The polymerization is performed accompanied by the degree of agitation customary in the suspension polymerization for maintenance of the dispersion of the monomer or monomers in the aqueous medium, and preferably in enameled or stainless steel-plated autoclaves.

The polymers produced according to the invention are particularly suitable for processing by thermoplastic shaping, that is, shaping by means of heat and pressure, for example, by calendering, extruding, deep drawing, injection molding or pressing, with or without plasticizers, for example, into sheets, also tubular sheets, plates, records and containers, for example, for food.

EXAMPLE

An autoclave lined with stainless steel and having a capacity of 0.6 liters was charged first with 250 gm of water and 0.24 gm of hydroxyethyl cellulose having an average of 2.3 hydroxyethoxy groups per glucose anhydride unit and a viscosity of about 300 cP, measured at 20° C., in a 2% by weight aqueous solution. Then the air was exhausted from the autoclave so that the pressure in the autoclave was only about 15 mm of Hg (abs). Subsequently 120 gm of vinyl chloride were added to the autoclave. Finally the pressure in the autoclave was increased by about 1 atmosphere, impressing oxygen at 20° C., so that the oxygen is present in amounts within the range of 0.01 to 3% by weight, based on the weight of vinyl chloride. The autoclave was then rotated vertically in a water bath held at 70° C. for 40 hours. After cooling to 20° C. and expansion of the autoclave to normal pressure, a fine-grained polyvinyl chloride with a K-value (the K-value is a measure of the degree of polymerization; see H. Fikentscher, Cellulose-chemie, Vol. 13, 1932, p. 58f) of 55 is obtained in a practically 100% yield.

In order to determine the properties of the polymerizate thus obtained, a sample was prepared of 26% by weight of di-2-ethylhexylphthalate, based on the weight of the sample, 1% by weight of a mixed barium cadmium laurate, based on the weight of the sample, and 0.5% by weight, based on the weight of the sample, of a wax (consisting substantially of montanic acid esters with the following characteristics:

Melting point: 80° to 83° C.
Solidification point: 76° to 79°
Acid number: 125 to 145
Saponification number: 150 to 170
Ester number: 25
Unsaponifiable: 7 to 10
Specific gravity at 20° C.:0.99 to 1.00)

and mixed with the polymerizate. A sheet for the heat stability test was produced from the mixture by rolling for 15 minutes at 160° C. This sheet, after heating for 60 minutes at 175° C., was merely colored yellow.

For another test of the polyvinyl chloride, produced as described above, with a K-value of 55, a sample was prepared of 33% by weight of di-2-ethylhexylphthalate, based on the weight of the sample, 1% by weight of wax of the above-described type based on the weight of the sample, and 0.5% by weight of carbon black, based on the weight of the sample. A sheet for the "fish eye" test was produced by rolling the sample for 10 minutes at 140° C. This sheet had 350 to 600 "fish eyes" per 100 cm².

For comparison, the above-described procedures were repeated with the variation that instead of oxygen, 0.12% by weight of dilauryl peroxide based on the weight of vinyl chloride was used. The polyvinyl chloride thus obtained also had a K-value of 55. The sheet, tested in the heat stability test was already as yellow after 45 minutes at 175° C. as the sheet prepared from the polyvinyl chloride produced according to the invention after 60 minutes, and it turned brown after 55 minutes of heating. The sheet, tested for "fish eyes" had over 10,000 "fish eyes" per 100 cm².

While we have disclosed a specific embodiment of the invention, it will be readily apparent to one skilled in the art that the present invention is not limited to this specific embodiment and that various changes and modifications may be made without departing from the spirit of the invention.

We claim:

1. A process for the production of a polymerizate of polyvinyl chloride by suspension polymerization which consists essentially of the steps of
   (1) mixing vinyl chloride with water, in a ratio such that the amount of said vinyl chloride is from 20 to 50% by weight of the total weight of water and vinyl chloride, in the presence of from 0.01 to 0.5% by weight, based on the weight of said vinyl chloride, of hydroxyethylcellulose, and a gas containing molecular oxygen selected from the group consisting of air and oxygen in an amount of from 0.01 to 3% by weight of molecular oxygen, based on the weight of said vinyl chloride, as the sole polymerization catalyst or catalyst-forming substance,
   (2) adjusting said mixture to a pH of from 1.0 to 7.5,
   (3) heating said mixture to polymerization temperature of from 65° to 80° C and under the autogenetic pressure while under continuous agitation for a time sufficient to effect polymerization, and
   (4) recovering said polymerizate.

2. In the suspension polymerization process for the production of polymerizates of polyvinyl chloride which comprises polymerizing a suspension of vinyl chloride in water in the presence of a polymerization catalyst and from 0.01 to 0.5% by weight, based on the weight of said vinyl chloride, of hydroxyethylcellulose, the improvement which consists essentially in conducting the polymerization at a temperature of from 65° to 80° C under the autogenetic pressure at a pH of from 1.0 to 7.5 where the amount of said vinyl chloride is from 20 to 50% by weight of the total weight of water and vinyl chloride and utilizing solely a gas containing molecular oxygen selected from the group consisting of air and oxygen in an amount of from 0.01 to 3% by weight of molecular oxygen based on the weight of said vinyl chloride, as said polymerization catalyst.

3. The process of claim 1 wherein said gas containing molecular oxygen is oxygen.

* * * * *